Jan. 16, 1962 G. W. BOOTH 3,017,099
PARALLEL BINARY ADDER
Filed Aug. 29, 1957
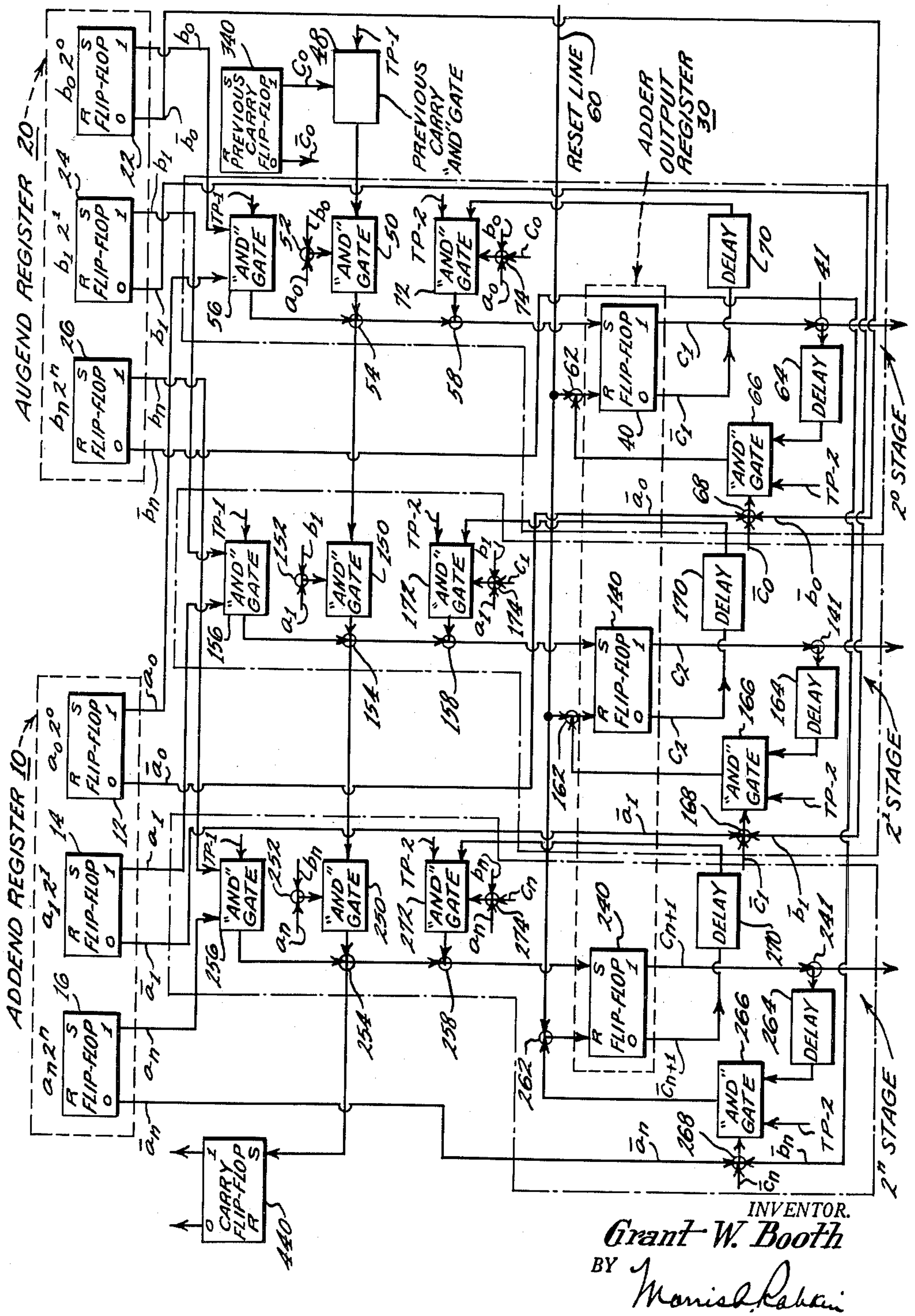
INVENTOR.
Grant W. Booth
BY Morris A. Rabkin
ATTORNEY.

United States Patent Office 3,017,099

Patented Jan. 16, 1962

3,017,099

PARALLEL BINARY ADDER

Grant W. Booth, Collingswood, N.J., assignor to Radio Corporation of America, a corporation of Delaware Filed Aug. 29, 1957, Ser. No. 680,999

4 Claims. (Cl. 235—175)

This invention relates to adders and in particular to parallel binary adders.

Binary adders frequently utilize trigger circuits whereby pulses trigger a bistable circuit to change the adder from one condition to another. Such an adder is subject to faulty operation due to extraneous pulses. Many binary adders use complex equipment.

Therefore, it is an object of this invention to provide a novel parallel binary adder having efficient, positive operation.

In accordance with this invention, a novel parallel binary adder is obtained through the use of two different types of standard circuits: gates and flip-flops. Information from addend and augend registers are passed through gates when the gates are excited by a first timing pulse. The outputs of these gates provide carry information to the higher binary stages, or orders. This carry information is also directed to "set" flip-flops of an adder output register. Thus, upon the application of the first timing pulse to the gates, the addend and augend registers are operated upon to store a carry in the adder output register.

Upon the application of a subsequent timing pulse, hereafter termed a second timing pulse, to other gates, the carry information, the addend, and the augend data are combined in the adder output register to record the desired sum.

The novel features of this invention as well as the invention itself, both as to its organization and method of operation, will best be understood from the following description when read in connection with the accompanying drawing, in which the sole FIGURE illustrates a schematic embodiment of the invention.

The system comprises different types of circuits. These circuits and their component parts may be defined as follows:

(1) *Flip-flop.*—The term flip-flop is used to denote any electrical circuit having two controllable stable states. One specific embodiment of a flip-flop which is used in binary computer registers is described and shown in the "IRE Transactions on Electronic Computers," volume EC–5, September 1956, Number 3, article entitled "Logic Circuits for a Transistorized Digital Computer," by G. W. Booth et al., pp. 132–138, see Fig. 1, pages 133–134. The flip-flop, as described herein, does not employ a "trigger" input, but may employ "set" and "reset" inputs.

(2) *Gated pulse amplifier.*—A gated pulse amplifier functions as an "and" gate having a delay, and may include "or" circuits at the inputs. A gated pulse amplifier is described and shown in Fig. 2, pages 135–136, of the aforesaid Booth et al. article. The gated pulse amplifier described therein efficiently combines or-gates, and-gates, and inherent delay, so that the basic logic circuit may be used in many applications.

*a. "And" gate.*—An "and" gate is a circuit having an output and a multiplicity of inputs so designed that the output is energized when and only when every input is in its prescribed state. An "and" gate performs the function of the logical "and."

*b. "Or" gate.*—An "or" gate is a gate whose output (or outputs) is energized when any one or more of its inputs is in its prescribed state and may act as an isolating circuit that avoids any reaction of a driven circuit upon a corresponding driving circuit.

*c. Delay element.*—A delay element is any device for producing a time delay of a signal. The delay element may be inherent (or otherwise "built in") in other circuits, such as flip-flops, or gated pulse amplifiers, or may be separate devices which temporarily store information.

Referring to the FIGURE, there is shown an addend register 10 comprising a plurality of flip-flops 12, 14, 16, an augend register 20 comprising a plurality of flip-flops 22, 24, 26, and an adder output register 30 comprising flip-flops 40, 140 and 240. The addend, augend and adder output registers 10, 20 and 30 are storage devices in which a binary number may be stored. A binary register may be a series of bi-stable electronic circuits or flip-flops each having two stable states.

The "one" outputs from the flip-flops 12, 14, 16 in the addend register 10 are represented, respectively, as $a_0$, $a_1$, and $a_n$. A register may comprise any number of stages, but for simplicity of illustration only three stages are shown. Thus, only three stages are shown of the addend register 10, of the augend register 20, and the adder output register 30. The "zero" outputs for the flip-flops 12, 14, and 16 are represented, respectively, as $\bar{a}_0$, $\bar{a}_1$, and $\bar{a}_n$. Similarly, the flip-flops 22, 24, and 26 of the augend register 20 have their respective "one" outputs represented as $b_0$, $b_1$, and $b_n$, and their "zero" outputs represented, respectively as $\bar{b}_0$, $\bar{b}_1$, and $\bar{b}_n$. Similarly, the adder output register 30 has its flip-flops 40, 140, and 240 producing, at their "one" outputs, voltage levels designated as $c_1$, $c_2$, and $c_{n+1}$ and at their "zero" outputs voltage levels designated as $\bar{c}_1$, $\bar{c}_2$, and $\bar{c}_{n+1}$.

A previous carry may be stored in a previous carry flip-flop 340. This carry may be derived from a previous operation in the computer. The "one" output of the previous carry flip-flop 340, represented as $c_0$, is connected to an input of a two-input, previous carry "and" gate 48. An energizing line for a first energizing pulse TP–1 is connected to a second input of the "and" gate 48. The output of the "and" gate 48 is connected to an input of a first $2^0$ stage "and" gate 50.

The $a_0$ output from the "one" terminal of the flip-flop 12 and $b_0$ from the "one" terminal of the flip-flop 22 are passed through respective inputs of an "or" gate 52 to a second input of the first $2^0$ stage "and" gate 50. Note that the inputs to "or" gate 52, as several of their inputs, are only labelled to indicate their connection. The output from the "and" gate 50 is connected to a first input of an "or" gate 54.

The $a_0$ level and the $b_0$ level, from flip-flops 12 and 22 are also fed to separate inputs of a second $2^0$ stage "and" gate 56 which has the first energizing pulse TP–1 applied as a third input. The output of the second $2°$ stage "and" gate 56 is connected to a second input of the "or" gate 54. The "or" gate 54 has two isolated outputs, each having like voltages and each representing the output of the "or" gate.

The output of the "or" gate 54, which provides the presence or absence of carry information, is coupled to the next successive binary stage, the $2^1$ stage, by a coupling to an input of a first $2^1$ stage "and" gate 150. The "one" output, $a_1$, of the flip-flop 14 of the addend register 10 and the "one" output, $b_1$, of the flip-flop 24 of the augend register 20 are connected to separate inputs of an "or" gate 152. The output of the "or" gate 152 is connected to a second input of the first $2^1$ stage "and" gate 150. The "one" output, $a_1$, of the flip-flop 14 and the "one" output $b_1$, of the flip-flop 24 are also fed, respectively, to separate inputs of a second $2^1$ stage "and" gate 156. The first energizing pulse TP–1 is connected to a third input of the second $2^1$ stage "and" gate 156.

The output of the first $2^1$ stage "and" gate 150 and the output of the second $2^1$ stage "and" gate 156 are connected, respectively, to separate inputs of an "or" gate 154 having isolated outputs. Each of the outputs of the "or" gate 154 represents the carry from the $2^1$ stage. One of the outputs of the "or" gate 154 is connected to a first input of a first $2^n$ stage "and" gate 250.

The "one" output of the flip-flop 16 of the addend register 10, whose voltage level is designated as $a_n$, and the "one" output of the flip-flop 26 of the augend register 20, whose voltage level is designated as $b_n$, are connected, respectively, to separate inputs of an "or" gate 252. The output of the "or" gate 252 is connected to a second input of the first $2^n$ stage "and" gate 250. The voltage levels $a_n$ and $b_n$ are also connected, respectively, to separate inputs of a second $2^n$ stage "and" gate 256. The first energizing pulse TP–1 is connected to a third input of the second $2^n$ stage "and" gate 256. The outputs of the first and second $2^n$ stage "and" gates 250 and 256 are connected, respectively, to separate inputs of an "or" gate 254 having two, isolated outputs. Each of the outputs of the "or" gate 254 signifies the presence or absence of a carry pulse. One output leads to the "set" input of a "carry" flip-flop 440. This carry flip-flop 440 may be, for example, the previous carry flip-flop (similar to the previous carry flip-flop 340) associated with another adder, or with the same adder for use during a subsequent operation.

The second output of the "or" gate 54, associated with the $2^0$ stage, is passed through an isolating "or" gate 58 to the "set" input terminal of the flip-flop 40 of the adder output register 30. Similarly, the output from the "or" gate 154 is passed through an isolating "or" gate 158 to the "set" input terminal of the flip-flop 140; and the output from the second output terminal of the "or" gate 254 is passed through an isolating "or" gate 258 to the "set" input terminal of the flip-flop 240.

A reset line 60 is connected to the respective "reset" terminals of the flip-flops 40, 140, and 240 of the adder output register 30 through isolating "or" gates 62, 162, and 262, respectively. The "one" output of the $2^0$ stage flip-flop 40, representing the carry for the subsequent stage, $c_1$, is passed through an isolating "or" gate 41, through a delay element 64 to a first input of a third $2^0$ stage "and" gate 66. A second energizing pulse TP–2 is applied to a second input of the third $2^0$ stage "and" gate 66. Voltage levels, designated as $\bar{a}_0$, $\bar{b}_0$, and $\bar{c}_0$, are connected to respective inputs of an "or" gate 68. The $\bar{a}_0$ voltage level is obtained from the "zero" output of the $2^0$ flip-flop 12 of the addend register 10; the $\bar{b}_0$ voltage is obtained from the "zero" output of the $2^0$ flip-flop 22 of the augend register 20; and the $\bar{c}_0$ voltage level is obtained from the "zero" output of the previous carry flip-flop 340. The output of the "or" gate 68 is connected to the third input of the third $2^0$ stage "and" gate 66. The output of the "and" gate 66 is connected through the "or" gate 62 to "reset" the flip-flop 40 upon the occurrence of any one or more of the voltage levels $\bar{a}_0$, $\bar{b}_0$, and $\bar{c}_0$.

Similarly, connections are made from the "one" output of the adder output register $2^1$ flip-flop 140 through an "or" gate 141, through a delay element 164 to a first input of a third $2^1$ stage "and" gate 166 having its second input connected to receive the second energizing pulse TP–2 and having its third input connected to receive, through an isolating "or" gate 168, voltages representing $\bar{a}_1$, $\bar{b}_1$, and $\bar{c}_1$. The output of the "and" gate 166 is connected to reset the flip-flop 140 through the "or" gate 162. The voltage levels $\bar{a}_1$, $\bar{b}_1$, and $\bar{c}_1$ represent, respectively, the logical "not $a_1$," "not $b_1$," and "not $c_1$." The $\bar{a}_1$ voltage level is obtained from the "zero" output of the $2^1$ flip-flop 14 of the addend register 10. The $\bar{b}_1$ voltage level is obtained from the "zero" output of the $2^1$ flip-flop 24 of the augend register 20, and the $\bar{c}_1$ voltage level is obtained, from the "zero" output of the $2^0$ flip-flop 40 of the adder output register 30.

Likewise, the "one" output of the flip-flop 240 representing $c_{n+1}$ is passed, through an "or" gate 241, through a delay element 264 to a first input of a third $2^n$ stage "and" gate 266 having its second input connected to receive the second energizing pulse TP–2 and having its third input connected to receive, through an "or" gate 268, voltage levels representing $\bar{a}_n$, $\bar{b}_n$, and $\bar{c}_n$. The output of the third $2^n$ stage "and" gate 266 is connected to "reset" the $2^n$ flip-flop 240 through the "or" gate 262. The voltage levels $\bar{a}_n$, $\bar{b}_n$, and $\bar{c}_n$ represent, respectively, the logical "not $a_n$," "not $b_n$," and "not $c_n$." The $\bar{a}_n$ voltage level is obtained from the "zero" output of the $2^n$ flip-flop 16 of the addend register 10. The $\bar{b}_n$ voltage level is obtained from the "zero" output of the $2^n$ flip-flop 26 of the augend register 20, and the $\bar{c}_n$ voltage level is obtained from the "zero" output of the $2^{n-1}$ flip-flop (shown in the FIGURE as the $2^1$ flip-flop 140) of the adder output register 30.

The "zero" output of the flip-flop 40 representing $\bar{c}_1$, is connected through a delay element 70 to a first of three inputs of a fourth $2^0$ stage "and" gate 72. The second input of the gate 72 is connected to receive the second energizing pulse TP–2; the third input is coupled to receive through an "or" gate 74 voltage levels representing $a_0$, $b_0$, or $c_0$. The output of the fourth $2^0$ stage "and" gate 72 is directed through the "or" gate 58 to "set" the flip-flop 40 of the adder output register 30.

Various components are coupled together, in similar fashion, in the other stages. A delay element 170 connects the "zero" output of the flip-flop 140 of the $2^1$ stage of adder output register 30 to one of three inputs of a fourth $2^1$ stage "and" gate 172. The second input of the gate 172 receives the second energizing pulse TP–2; the third input of the gate 172 receives, through an "or" gate 174, voltage levels representing $a_1$, $b_1$, and $c_1$. Further, a delay element 270 connects the "zero output" of the $2^n$ flip-flop 240 of the adder output register 30 to one of three inputs of a fourth $2^n$ stage "and" gate 272. The second input of the gate 272 receives the second energizing pulse TP–2. The third input of the "and" gate 272 receives, through an "or" gate 274, voltage levels representing $a_n$, $b_n$, or $c_n$.

The adder may comprise a variable number of parallel stages. Additional stages may be added between the $2^1$ stage and the $2^{nth}$ stage as desired. As illustrated, a three stage adder comprises a $2^0$ stage, a $2^1$ (or $2^{n-1}$) stage, and a $2^n$ (or $2^2$) stage.

The operation of the adder is as follows: Upon the occurrence of the first energizing pulse TP–1, the previous carry "and" gate 48 and the second "and" gate of each stage, gates 56, 156, 256 are sensed. The previous carry "and" gate 48 indicates whether or not a carry of "1" existed from a previous operation, indicated by a "high" level from "one" output terminal, $c_0$, of the previous carry flip-flop 340. A carry from a previous operation, i.e., from flip-flop 340, and a "high" level representing the presence of a "1" in the addend or augend in the first stage causes a carry pulse to be generated by the first $2^0$ stage "and" gate 50. The first energizing pulse TP–1 opens the second $2^0$ stage "and" gate 56, so that when a "1" is present in both the addend and an augend of the $2^0$ stage, that is, a "high" level upon the $a_0$ and $b_0$ lines, a carry output of "1" is generated. Therefore, a "high" output from the "or" gate 54 indicates either a previous carry of "1" and an addend or augend of "1" in the $2^0$ stage, or an addend and augend of "1" in the $2^0$ stage. This output from the "or" gate 54 represents a "carry" output.

This "carry" output "sets" the $2^0$ flip-flop 40 of the adder output register 30 and is also presented as a previous carry to the next most significant stage through the first $2^1$ stage "and" gate 150. The $2^1$ stage gates 150 and 156 are similar in function and operation as the $2^0$ stage gates 50 and 56, respectively. An output from the "or" gate 154 represents an output from either the first or second $2^1$ stage "and" gates 150 and 156. A "high" output from the "or" gate 154 represents a carry from the $2^0$ stage and an addend or augend of "1" in the $2^1$ stage, or an addend and augend of "1" present in the $2^1$ stage. This output from "or" gate 154 is generated as the previous carry for the first $2^2$ stage ($2^n$ stage) "and" gate 250. The output from the "or" gate 154 is also directed to "set" the flip-flop 140 representing the $2^1$ stage of the adder output register 30.

Similarly, a "high" level from the output of the "or" gate 254 represents either the presence of a previous carry of "1" in the $2^{n-1}$ stage (the $2^1$ stage, as illustrated) and an addend or augend of "1" in the $2^n$ stage, or an addend and augend of "1" present in the $2^n$ stage. This "high" output which may be present at the output of the "or" gate 254 is directed to "set" the $n^{th}$ flip-flop 240 of the adder output register 30 and further represents a carry output for a subsequent operation, which may, for example, set a carry flip-flop 440, or be directed to subsequent stages or other operation.

Upon completion of the first energizing pulse TP–1 applied at the gates 48, 56, 156, and 256, the adder output register 30 stores the carries of the system. A carry stored in the adder output register for a binary stage may be represented from the following table:

*Binary addition table*

| | | | | | | | | |
|---|---|---|---|---|---|---|---|---|
| Addend | 0 | 1 | 0 | 0 | 1 | 1 | 0 | 1 |
| Augend | 0 | 0 | 1 | 0 | 1 | 0 | 1 | 1 |
| Previous carry | 0 | 0 | 0 | 1 | 0 | 1 | 1 | 1 |
| Subsequent carry (stored) | 0 | 0 | 0 | 0 | 1 | 1 | 1 | 1 |
| Sum | 0 | 1 | 1 | 1 | 0 | 0 | 0 | 1 |

For the sake of illustration, assume that the binary number stored in the addend register is 100 and that binary number stored in the augend register is 001 and that there is a previous carry of 1 stored in the previous carry flip-flop. Upon completion of the first energizing pulse TP–1, the adder output register reads 001 which indicates a carry for the $2^1$ stage. Note, that at this point of time, the addend remains stored in the addend register 10; the augend is stored in the augend register 20; and the carry is stored in the adder output register 30.

Assume, now, that another pulse is presented as a first energizing pulse at the gates 48, 56, 156, and 256, and/or assuming that the initial first timing pulse TP–1 was erratic and, instead of being a sharp rectangular pulse, occurred in a "sloppy" manner. The effect of spurious pulses upon the circuit would be nil. If another pulse were present, the flip-flops 40, 140, and 240 of the adder output register 30 would be set only if there is a "high" voltage level present at two of the following three for any one stage: an addend of "1" for that stage, an augend of "1" for that stage, and a carry of "1" from the previous stage. All the necessary voltages were present to set the flip-flops 40, 140, 240 where required, so that any further voltages occurring tending to set the various flip-flops are redundant, because the various flip-flops have already been "set." Likewise, any flip-flop not originally set by the initial energizing pulse TP–1 could not now be set because the condition of two of the three voltage levels required for "set," as stated above, were not present to set the respective flip-flop. Hence, at the end of the first energizing pulse TP–1, the carry information is stored in the adder output register 30. Note, that there is no "triggering" of the flip-flops, thereby affording more positive operation and thus reducing the possibility of error. The flip-flops can be "set" only by a pulse at the "set" terminals and "reset" only by a pulse at the "reset" terminals. There are no "trigger" pulses to trigger a flip-flop. The energizing pulse TP–1 is present only at the gates 48, 56, 156, and 256. A previous carry may ripple to the last stage. Thus, the pulse shape of the voltage level passing through need not be perfectly rectangular or of any particular critical wave shape, due to the lack of necessity of a timing pulse to be present at the gates 50, 150, and 250.

Upon the quiescent condition wherein the carries are stored in the adder output register 30, it is desired finally that the adder output register 30 store the sum of the addend and augend stored in the addend and augend registers 10, 20, and, if desired, that carry which may be stored in the previous carry flip-flop 340.

From the above table showing a three-input adder, it can be seen that a sum is not generated when an output carry is generated, except for one case. This is the instance where the previous carry, the addend, and the augend, each have a binary value of "one." The third $2^0$ stage "and" gate 66 (similarly, for the $2^1$ and $2^n$ "and" gates 166 and 266) operates in part to produce the logic, described above, upon the application of the second energizing pulse TP–2. The second energizing pulse TP–2 applied to the third and fourth "and" gates of each stage, i.e., gates 66, 72, 166, 266, and 272, occurs at a time subsequent to the first energizing pulse TP–1 which was applied only to the previous carry "and" gate 48, and to the second "and" gates for each stage, i.e., gates 56, 156, and 256.

If, upon application of the second energizing pulse, TP–2, the addend for the $2^0$ stage is "zero," that is, a "high" level for $\bar{a}_0$; a "zero" for the $2^0$ stage in the augend register, that is, a "high" level for $\bar{b}_0$; or a "zero" level for the previous carry, represented by a "high" level at $\bar{c}_0$ (that is, the previous carry flip-flop was reset); the flip-flop 40 is reset if there is a "1" stored in the flip-flop 40 as a result of the initial operation. That is, the flip-flop 40, having a "high" voltage present at its "1" output, and either an augend 0, and addend 0, or a previous carry 0, causes the flip-flop 40 to "reset." Thus, if the addend, augend, and previous carry are all "1"; the flip-flop 40 remains in the "1" condition. The sum is now generated in each stage where a previous carry existed.

If a previous carry stored in the adder output register 30 were zero, the fourth $2^0$ stage "and" gate 72 (172 and 272 for subsequent stages) produces a sum under the following condition: No "1" output stored in the $2^0$ flip-flop 40 and at least one of the operands $a_0$, $b_0$, or $c_0$ is a binary "1" value. Upon completion of the second energizing pulse TP–2, the proper sum for each stage exists in the adder output register 30.

The flip-flop output register 30 is used to temporarily store the intermediate carry output and then to store the final sum. The flip-flops 40, 140, 240 of the adder output register 30 thus serve to implement part of the addition logic as well as storing the result. The operation of the third and fourth "and" gates 66 and 72 depends upon the delay elements 64 and 70 which may be the inherent delay of the gates 66, 72, and the delay in the operation of the flip-flop 40 thereby obtaining fullest advantage of inherent delays in the circuit. Such inherent delays are present in the gated pulse amplifier, described in the Booth et al. article above cited. In the absence of inherent delays in the gates 66 or 72, delay lines 64 and 70 may be inserted between the output flip-flops 40, 140, 240 and their associated third and fourth "and" gates whereby the operation of the system is similar.

Returning again to the illustration described above where the addend register stored the binary number 100, the augend register stored the binary number 001, and the previous carry flip-flop stored the binary number 1. As stated above, upon the completion of the first energizing pulse TP–1, the number stored in the adder output register is 001. Upon the occurrence of the second energizing pulse TP–2, the $2^0$ flip-flop 40 of the adder output register 30 is reset due to the presence of the $\bar{a}_0$ at the third $2^0$ stage "and" gate 66 to "reset" the $2^0$ flip-flop 40. In regard to the $2^1$ stage, upon completion of the first energizing pulse TP–1, the flip-flop 140 remains in its reset, or zero, condition. Therefore, the presence of a $c_1$ level, obtained from the "one" output terminal of the flip-flop 40, causes the $2^1$ flip-flop 140 to be "set." Likewise, the *n*th stage output flip-flop 240 is in its "reset" condition, thus actuating the fourth $2^n$ stage "and" gate 272 when an energizing pulse TP–2 is present, and an addend of "1" from the addend flip-flop 16 is obtained at its "one" output terminal. Thus, the flip-flop 240 is "set" by the "and" gate 272. The result in the adder output register is 110, which is the correct sum of the binary 100, the binary 001 and the previous carry of 1.

The circuit described uses two different types of standard circuits: flip-flops and gates, thus simplifying circuitry. In addition, the parallel binary adder, in utilizing the adder output register for storing of a carry, does not depend upon triggering of flip-flops, but assures reliable operation through the use of "set" and "reset" voltage inputs.

What is claimed is:

1. A binary adder comprising an addend flip-flop; an augend flip-flop; a previous carry flip-flop; a sum flip-flop; each of said flip-flops having two stable states, one of which is a set state and the other of which is a reset state, set and reset input terminals corresponding respectively to said two states, a binary "1" output having an enabling voltage corresponding to said set state and a complementary non-enabling voltage corresponding to said reset state, and a binary "0" output having two voltages respectively complementary to those of said binary "1" outputs, said sum flip-flop being responsive to an enabling voltage at its said set input terminal to assume its said set state and responsive to an enabling voltage at its said reset input terminal to assume its said reset state; means for receiving a first timing pulse; means for receiving a second timing pulse later than said first pulse; a first gating means connected to receive said "1" outputs of said addend, augend, and previous carry flip-flops and to receive from said first timing pulse receiving means said first timing pulse and to apply said first timing pulse as an enabling voltage to the set input terminal of said sum flip-flop when simultaneously with said first timing pulse at least two of said addend, augend, and previous carry flip-flop "1" outputs have enabling voltages; a second gating means connected to receive said sum flip-flop "0" output, said addend, augend, and previous carry "1" outputs and to receive from said second timing pulse receiving means said second timing pulse and to apply said second timing pulse as an enabling voltage to said sum flip-flop set terminal when simultaneously with said second timing pulse said sum flip-flop "0" output and any one of said addend, augend, and previous carry flip-flop "1" outputs have enabling voltages; a third gating means connected to receive said sum flip-flop "1" output and to receive said addend, augend, and previous carry flip-flop "0" outputs and to receive, from said second timing pulse receiving means, said second timing pulse and applying said second timing pulse as an enabling voltage to said sum flip-flop reset terminal when simultaneously said sum flip-flop "1" output and any one of said addend, augend, and previous carry flip-flop "0" outputs have enabling voltages, whereby said sum flip-flop "1" output has an enabling voltage corresponding to a binary "1" and a non-enabling voltage corresponding to a binary "0" of a sum including a previous carry, if any.

2. In a parallel binary adder, in combination, flip-flop means having set and reset input terminals and two output circuits, for producing a delayed "one" voltage at one output circuit when set and a delayed "zero" voltage at the other output circuit when reset; a source of first and second timing pulses; a source of addend, augend and carry voltages, and voltages complementary to said addend, augend and carry voltages; first gating means responsive to the concurrent receipt from said sources of a first timing pulse, said carry voltage, one of said addend and augend voltages for applying a set voltage to said set terminal; second gating means responsive to the concurrent receipt of a second timing pulse, one of said addend, augend and carry voltages and a delayed "zero" output voltage from said flip-flop means for applying a set voltage to said set terminal; and third gating means responsive to one of the three voltages complementary to said addend, augend and carry voltages, a second timing pulse, and the delayed one output voltage of said flip-flop means for applying a reset voltage to said reset terminal.

3. In a binary adder, a source providing addend, augend and carry voltages, and voltages indicative of the absence of said addend, augend and carry voltages; a source providing a first timing pulse and a later occurring, second timing pulse; a flip-flop circuit having set and reset input terminals, a "one" output terminal for producing a given output voltage when the flip-flop circuit is set and a "zero" output terminal for producing a given output voltage when the flip-flop circuit is rest; means responsive to said first timing pulse and both said addend and augend voltages for applying a set voltage to said set terminal; means responsive to said second timing pulse and said given output voltage of said "zero" output terminal, and one of said addend, augend and carry voltages for applying a set voltage to said set terminal; and means responsive to said second timing pulse and one of said voltages indicative of the absence of the addend, augend and carry voltages, and said given output voltage of said "one" output terminal for applying a reset voltage to said reset terminal.

4. In a binary adder having a flip-flop circuit which produces output voltages indicative of storage of the binary digits "zero" and "one," and including also a source of addend, augend and carry voltages and voltages indicative of the absence of said addend, augend and carry voltages, and a source of timing pulses; means responsive to a given timing pulse, said output voltage indicative of the binary digit "zero" from said flip-flop circuit, and one of said addend, augend and carry voltages for setting said flip-flop circuit; and means responsive to said given timing pulse, said output voltage indicative of the binary digit "one" from said flip-flop circuit, and the absence of one of said addend, augend and carry voltages for resetting said flip-flop circuit.

References Cited in the file of this patent

UNITED STATES PATENTS

| | | |
|---|---|---|
| 2,719,670 | Jacobs et al. | Oct. 4, 1955 |
| 2,803,401 | Nelson | Aug. 20, 1957 |

OTHER REFERENCES

Weinberger et al.: One-Microsecond Adder Using One-Megacycle Circuitry, IRE Transactions on Electronic Computers, vol. EC–5, No. 2, June 1956 (pages 65 to 73, note Fig. 10, pg. 71).